(12) United States Patent
Peronnin et al.

(10) Patent No.: US 12,475,402 B2
(45) Date of Patent: Nov. 18, 2025

(54) SYSTEM FOR AUTONOMOUS STABILISATION OF QUANTUM STATES HAVING A PREDETERMINED PARITY FOR ERROR CORRECTION

(71) Applicants: CENTRE NATIONAL DE LA RECHERCHE SCIENTIFIQUE (CNRS), Paris (FR); ECOLE NORMALE SUPERIEURE DE LYON, Lyons (FR); UNIVERSITE CLAUDE BERNARD LYON 1, Villeurbanne (FR)

(72) Inventors: Théau Peronnin, Paris (FR); Benjamin Huard, Lyons (FR); Sébastien Jezouin, Paris (FR); Antoine Marquet, Lyons (FR)

(73) Assignees: CENTRE NATIONAL DE LA RECHERCHE SCIENTIFIQUE (CNRS), Paris (FR); ECOLE NORMALE SUPERIEURE DE LYON, Lyons (FR); UNIVERSITE CLAUDE BERNARD LYON 1, Villeurbanne (FR)

( * ) Notice: Subject to any disclaimer, the term of this patent is extended or adjusted under 35 U.S.C. 154(b) by 298 days.

(21) Appl. No.: 18/246,673

(22) PCT Filed: Sep. 24, 2021

(86) PCT No.: PCT/FR2021/051645
§ 371 (c)(1),
(2) Date: Sep. 1, 2023

(87) PCT Pub. No.: WO2022/064155
PCT Pub. Date: Mar. 31, 2022

(65) Prior Publication Data
US 2024/0403687 A1    Dec. 5, 2024

(30) Foreign Application Priority Data
Sep. 25, 2020   (FR) ..................... 2009795

(51) Int. Cl.
*G06N 10/70*   (2022.01)
*G06N 10/40*   (2022.01)

(52) U.S. Cl.
CPC ............ *G06N 10/70* (2022.01); *G06N 10/40* (2022.01)

(58) Field of Classification Search
CPC ....... G06N 10/70; G06N 10/40; H03K 19/195
See application file for complete search history.

(56) References Cited

U.S. PATENT DOCUMENTS 11,037,068 B2 *  6/2021  Girvin ................. G06N 10/40
11,782,779 B2 * 10/2023  Albert ................. G06N 10/70
                                                       706/45

(Continued)

OTHER PUBLICATIONS

K. -Y. Kuo and C. -Y. Lai, "The Encoding and Decoding Complexities of Entanglement-Assisted Quantum Stabilizer Codes," 2019 IEEE International Symposium on Information Theory (ISIT), Paris, France, 2019, pp. 2893-2897, (Year: 2019).*

(Continued)

Primary Examiner — Cynthia Britt
(74) Attorney, Agent, or Firm — Fenwick & West LLP

(57) ABSTRACT

Disclosed is a system (200) for autonomous stabilisation of quantum states, comprising: a quantum harmonic oscillator (202), an auxiliary device (201) dispersively coupled to the oscillator (202), a dissipater (203), an exciter (204) configured to generate first (205, 405) and second (206, 406) frequency combs, intended to be sent to at least one among the quantum harmonic oscillator (202), the auxiliary device (201) and dissipater (203) characterised in that a first frequency difference separating two successive lines of the first (Continued)

| Legend | |
|---|---|
| 200 | state stabilization system |
| 201 | auxiliary device |
| 202 | oscillator |
| 203 | dissipater |
| 204 | exciter |
| 205 | first frequency comb |
| 206 | second frequency comb | frequency comb (205, 405) is equal to twice a second frequency difference separating two successive lines of the second comb (206, 406).

10 Claims, 4 Drawing Sheets

(56) References Cited

U.S. PATENT DOCUMENTS

| | | | |
|---|---|---|---|
| 2012/0133931 A1* | 5/2012 | Fermann | G01J 3/10 |
| | | | 372/18 |
| 2020/0242500 A1* | 7/2020 | Girvin | G06N 10/70 |
| 2024/0054381 A1* | 2/2024 | Peronnin | G06N 10/40 |

OTHER PUBLICATIONS

Lamont et al. "Route to stabilized ultrabroadband microresonator-based frequency combs" 2013 Optical Society of America OCIS Codes: (230.5750) Resonators; (190.4410) Nonlinear optics, parametric processes. http://dx.doi.org/10.1364/OL.99.099999 (Year: 2013).*

PCT International Search Report and Written Opinion, International Application No. PCT/FR2021/051645, dated Jan. 18, 2022, 8 Pages.

Gertler, Jeffrey M. et al. "Protecting a bosonic qubit with autonomous quantum error correction" Nature (London), England, Apr. 20, 2020 (Apr. 20, 2020), pp. 243-248, Retrieved from the Internet:https://arxiv.org/pdf/2004.09322v 1 .pdf.

* cited by examiner

| Legend | |
|---|---|
| 100 | relaxation process |
| 101 | effective dissipation channel |
| 102 | alteration channel |

| Legend | |
|---|---|
| 200 | state stabilization system |
| 201 | auxiliary device |
| 202 | oscillator |
| 203 | dissipater |
| 204 | exciter |
| 205 | first frequency comb |
| 206 | second frequency comb |

| Legend | |
|---|---|
| 401 | first level |
| 402 | second level |
| 403 | third level |
| 404 | fourth level |
| 405 | first frequency comb |
| 406 | second frequency comb |
| 407 | de-energization process |
| 408 | effective transfer rate |

| Legend | |
|---|---|
| 501 | positive peak |
| 502 | negative peak |
| 503 | peak |

SYSTEM FOR AUTONOMOUS STABILISATION OF QUANTUM STATES HAVING A PREDETERMINED PARITY FOR ERROR CORRECTION

FIELD OF THE INVENTION

The invention relates to the autonomous stabilization of quantum states having a predetermined parity and the correction of errors in the coding of quantum information, in particular in the coding that encodes information in a bosonic system having a dimension, in the sense of Hilbert space, larger than the two states needed to encode one bit of information.

PRIOR ART

The implementation of a quantum information processing requires implementing error correction protocols to correct undesirable changes in the qubit states that inevitably occur due to their coupling to the outside world.

In bosonic-type quantum information protocols, the information is encoded into states of a quantum harmonic oscillator.

Throughout this text, by harmonic oscillator, it should be understood any oscillator whose characteristic frequency does not change by more than 20% per quantum of excitation.

The states of the oscillator may be decomposed based on Fock's states, each Fock's state corresponding to a particular number of bosons comprised in the oscillator.

The parity of the number of bosons may allow defining a parity for the states of the quantum harmonic oscillator. An even state of the oscillator may be defined when in the decomposition of this state based on Fock's states, the only non-zero coefficients are the coefficients of the Fock's states corresponding to an even number of bosons.

Quantum error correction methods are known to correct certain errors, in particular in the case of a protocol where the information coding uses only states of the quantum harmonic oscillator with a particular parity.

These error correction methods are based on keeping the parity of the states that encode the information, cf. for example the documents OFEK Nissim et al. "*Extending the lifetime of a quantum bit with error correction in superconducting circuits*", Nature 536 pages 441 to 445; MICHAEL Marios H. et al. "*New Class of Quantum Error-correcting codes for a Bosonic Mode*", Physical Review X Vol. 6 pages 031006; GERTLER Jeffrey M et al. "*Protecting a Bosonic Qubit with Autonomous Quantum Error Correction*" <https://arxiv.org/abs/2004.09322>. For example, if an error occurs and the parity is changed, the error may be corrected by adding a boson in the quantum harmonic oscillator.

However, these error correction methods may be extremely difficult to carry out experimentally. This is the case when they require continuous parity measurement in order to detect parity changes in real-time when they occur and immediately apply corrections, for example like in the aforementioned documents by OFEK Nissim and GERTLER Jeffrey M.

Autonomous correction methods that are simpler to implement are known, cf. for example the aforementioned document by GERTLER Jeffrey M. These methods are based on system engineering allowing error detection and correction to be carried out autonomously, without the intervention of the experimenter, within the quantum system itself.

However, the autonomous correction methods of the prior art do not give complete satisfaction because in cases where no error has occurred, a correction could still be performed and a boson could be added to the harmonic oscillator. This added boson induces a change in the parity while the latter had the predetermined value, which causes an error.

Hence, there is a need for a more selective parity error correction protocol, i.e. an error correction protocol that performs a correction only when the parity does not have a predetermined value.

DISCLOSURE OF THE INVENTION

The invention aims to provide a more selective parity error correction protocol than in the prior art.

The object is achieved in the context of the present invention thanks to a system for autonomous stabilization of quantum states comprising:
- a quantum harmonic oscillator configured to carry information encoded in states of the oscillator having a predetermined parity of a number of bosons comprised in the harmonic oscillator,
- an auxiliary device configured to be in a ground state $|g\rangle$ or in an excited state $|f\rangle$ amongst a plurality of excited states, the device being dispersively coupled to the oscillator, so that a frequency difference between the ground state $|g\rangle$ and the excited state $|f\rangle$ linearly depends on a frequency shift $\chi$ and the number of bosons,
- a dissipator configured to switch from an excited state $|1\rangle$ to a ground state $|0\rangle$,
- an exciter configured to generate first and second frequency combs, intended to be sent to at least one amongst the quantum harmonic oscillator, the auxiliary device and the dissipator so as to add a boson in the harmonic oscillator if the number of bosons does not have the predetermined parity,
- a first frequency difference separating two successive lines of the first frequency comb being equal to twice the frequency shift $\chi$ and being equal to twice a second frequency difference separating two successive lines of the second comb.

Advantageously, such a system is completed by the following different features considered separately or in combination:
- the first and second combs have peaks in the time domain, the peaks of the first comb being time-shifted with respect to the peaks of the second comb;
- for each integer k of a set of integers, the system is configured to be in:
  - a first level defined by a first number of bosons equal to the integer k, the ground state $|g\rangle$ and the ground state $|0\rangle$,
  - a second level defined by a second number of bosons equal to the integer k+1, the excited state $|g\rangle$ and the ground state $|0\rangle$,
  - a third level in which the device auxiliary device is in the excited state $|f\rangle$ and the dissipator is in the stable state $|0\rangle$,
  - a fourth level in which the auxiliary device is in the ground state $|g\rangle$ and the dissipator is in the excited state $|1\rangle$,
  - the exciter being configured to couple, for each integer k, the first, third and fourth levels if the integer k does not have the predetermined parity, so as to switch the system from the first level to the second level, the exciter being configured to generate the first and second frequency combs so that, for each integer k:
the first comb comprises a first line if the integer k does not have the predetermined parity, the first line having a frequency equal to a transition frequency between the first and third levels, and
the second comb comprises a second line having a frequency equal to a transition frequency between the third and fourth levels;
the harmonic oscillator comprises the second number of bosons equal to the integer k+1 in the fourth level;
the quantum harmonic oscillator is a first superconducting microwave resonator, the auxiliary system is a transmon, the dissipator is a second superconducting microwave resonator having a quality factor lower than a quality factor of the first superconducting microwave resonator;
an amplitude of the lines of the first frequency comb and of the second frequency comb is characterized by a coupling frequency, the coupling frequency being lower than the quarter of the second frequency difference;
the information is encoded in states of the oscillator corresponding to a number of bosons between a floor integer $k_{min}$ having the predetermined parity and a ceiling integer $k_{max}$ having the predetermined parity, the set of integers being equal to the integers comprised between the integers $k_{min}-1$ and $k_{max}-1$.

The invention also relates to a method for autonomous stabilization of quantum states comprising the following steps:
encoding information in states of a quantum harmonic oscillator, the states having a predetermined parity of a number of bosons comprised in the harmonic oscillator,
dispersively coupling the harmonic oscillator to an auxiliary device, so that a frequency difference between a ground state |g⟩ of the auxiliary device and an excited state |f⟩ of the auxiliary device linearly depend on a frequency shift $\chi$ and the number of bosons,
coupling the auxiliary device to a dissipator configured to switch from an excited state |1⟩ into a ground state |0⟩
generating first and second frequency combs, a first frequency difference separating two successive lines of the first frequency comb being equal to twice the frequency shift $\chi$ and equal to twice a second frequency difference separating two successive lines of the second comb and
sending the first and second frequency combs to at least one amongst the quantum harmonic oscillator, the auxiliary device and the dissipator so as to add a boson in the harmonic oscillator if the number of bosons n does not have the predetermined parity.

Advantageously, such a method is completed by the following different features or steps considered separately or in combination:
an optimization of the amplitude of the lines of the first and second frequency combs, the amplitude of the lines being characterized by a coupling frequency, comprising the following steps:
(E1) selecting a coupling frequency value lower than the quarter of the second frequency difference,
(E2) measuring a lifetime of the states having a number of bosons of the predetermined parity and
(E3) modifying the value of the coupling frequency based on the lifetime measured according to an optimization algorithm of the lifetime so as to identify an optimum value of the coupling frequency corresponding to a maximum of the lifetime;
an optimization of a de-energization rate $\gamma_{dis}$ equal to the probability of switching from the level |1⟩ to the level |0⟩ per unit of time, comprising the following steps:
(S1) selecting a value of the de-energization rate lower than the second frequency difference,
(S2) measuring a lifetime of the states having a number of bosons of the predetermined parity and
(S3) modifying the value of the de-energization rate based on the lifetime measured according to an optimization algorithm of the lifetime so as to identify an optimal value of the de-energization rate corresponding to a maximum of the lifetime.

DESCRIPTION OF THE FIGURES

Other features and advantages of the invention will arise from the following description, which is purely illustrative and non-limiting, and should be read with reference to the appended drawings wherein.

DETAILED DESCRIPTION OF THE INVENTION

The present invention aims to autonomously stabilize a predetermined parity of the number of bosons of a quantum harmonic oscillator.

For simplicity, it is assumed in the following that it is the even parity that should be stabilized. Hence, an odd number of bosons corresponds to an error that should be corrected. Trivial changes would allow stabilizing the odd parity.

Error and Correction Channels

Figure 1:
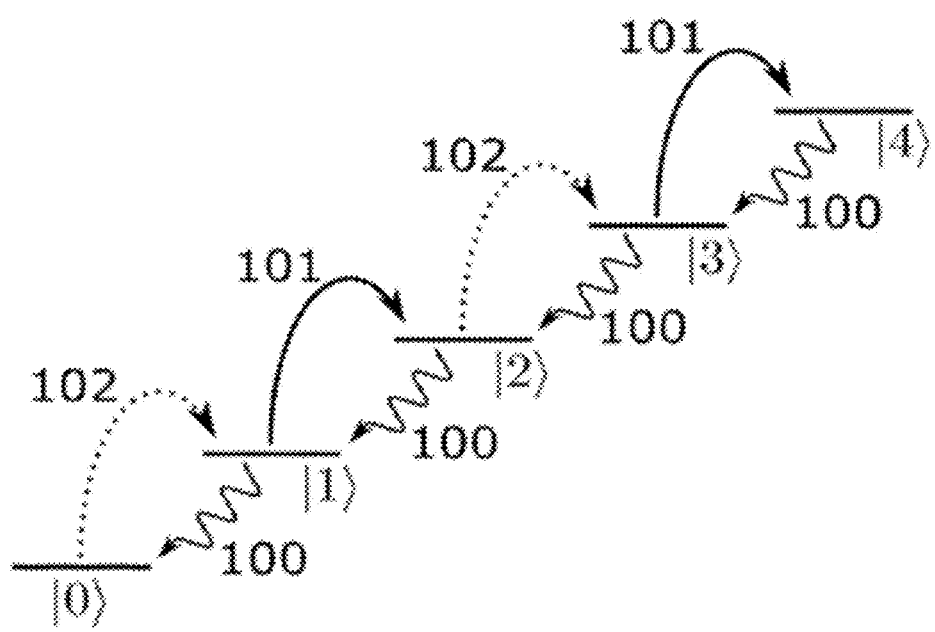
FIG. 1 is a schematic representation of the states of a harmonic oscillator.

The main error channel leading to a change in parity is the loss of a boson from the quantum harmonic oscillator. FIG. 1 schematically represents the states of a harmonic oscillator and the error channel. A harmonic oscillator may be in a state |k⟩, where k is an integer and represents the number k of bosons contained in the oscillator. The states |0⟩, |1⟩, etc., of the quantum harmonic oscillator are represented by horizontal lines in FIG. 1. Two successive states of the oscillator are separated by a constant energy difference $\hbar\omega_{osc}$ where $\omega_{osc}$ is the resonance frequency of the quantum harmonic oscillator, the state |0⟩ being the lowest energy state. The energy level of a state is represented vertically, so that the horizontal lines of the states |0⟩, |1⟩, etc., are vertically separated by the same distance in FIG. 1. The relaxation process 100 is a transition from a state |k⟩ into a state |k−1⟩ and corresponds to the loss of a boson.

The relaxation process 100 is characterized by a relaxation rate $\gamma_{osc}$, so that the probability of transition from a state |k⟩ into a state |k−1⟩ per unit of time is equal to $k\chi\gamma_{osc}$.

One way to autonomously stabilize parity against the loss of a boson consists in making an effective dissipation channel 101 adding a boson in the quantum harmonic oscillator if the number of bosons is odd.

In FIG. 1, this channel is represented by continuous arrows between a state |k⟩ into a state |k+1⟩ when k is odd. In the case of FIG. 1 and in compliance with the choice of stabilizing the even parity, even numbers k of bosons, |0⟩, |2⟩, |4⟩, etc. are to be stabilized.

The effective dissipation channel 101 or correction process 101 is characterized by a correction rate $\gamma_{up}$, which is equal to the probability of addition of a boson per unit of time. Depending on how the correction process 101 is carried out, the correction rate $\gamma_{up}$ may depend on the number k of bosons.

The process of stabilizing the parity is even more effective as the correction rate $\gamma_{up}$ is high compared to the relaxation rate $\gamma_{osc}$.

However, in the prior art, implementations of an effective dissipation channel 101 induce an alteration channel 102, for example like in the aforementioned document GERTLER Jeffrey M. The alteration channel 102 has the effect of adding a boson in the oscillator when the parity is even, which is undesirable. Indeed, an even parity of the number of bosons corresponds to a state of the oscillator that should not be modified.

In FIG. 1, the alteration channel 102 is represented by dotted arrows from a state |k⟩ to a state |k+1⟩ when k is even.

The alteration channel 102 or alteration process 102 is characterized by an alteration rate $\bar{\gamma}_{up}$, which is equal to the probability of addition of a boson per unit of time. Depending on how the correction process 101 is carried out, the alteration rate $\bar{\gamma}_{up}$ may depend on the number k of bosons.

It is important to minimize the alteration rate $\bar{\gamma}_{up}$ at least for the following three reasons.

The corruption channel 102 generates parity errors.

In embodiments of an effective dissipation channel 101 of the prior art, the alteration rate $\bar{\gamma}_{up}$ increases when the correction rate $\gamma_{up}$ increases. This limits the ability to correct the relaxation process 100, because increasing the correction rate $\gamma_{up}$ also increases the alteration rate $\bar{\gamma}_{up}$.

In some cases like in the four-legged cat code cf. MIR-RAHIMI N J P et al. "*Dynamically protected cat-qubits: a new paradigm for universal quantum computation*", New Journal of Physics, vol. 16 and hereinafter, the parity errors generated by the alteration process 102 are not corrected by the correction process 101 but on the contrary aggravated.

Four-Legged Cat Code

A four-legged cat is defined as the superposition of four coherent states of the quantum harmonic oscillator whose phases differ by a value of $\pi/2$. When a four-legged cat is decomposed over the states |k⟩, the only non-zero coefficients correspond to numbers p of bosons congruent to n modulo 4, where n is a predetermined integer which may be equal to 0, 1, 2 or 3.

Each value of the predetermined integer n defines a four-legged cat. Hence, there are four four-legged cats.

The four-legged cats corresponding to the predetermined integer n equal to 0 or 2 may allow defining a first logical qubit.

The four-legged cats corresponding to the predetermined integer n equal to 1 or 3 define a second logical qubit. A change in the parity (caused for example by a loss or a gain of a boson in the harmonic oscillator) in a logical qubit is equivalent to a change in the logical qubit. In other words, the loss or gain of a boson in the harmonic oscillator switches from the first logical qubit switch into the second logical qubit and vice versa.

A four-legged cat code consists in correcting such an error. The loss of a boson may be corrected by immediately adding a boson to the harmonic oscillator. The gain of a boson may be corrected by immediately removing a boson from the harmonic oscillator.

On the other hand, the consecutive loss or addition of two bosons of the harmonic oscillator cannot be corrected and results in a logical error.

For a successive loss of two bosons to occur, it is necessary to lose a first boson by the relaxation process 100, then to lose a second boson by the relaxation process 100 before the gain of a boson by the correction process 101 occurs.

The probability that the second boson will be lost before the correction process acts is equal to the ratio $\gamma_{osc}/\gamma_{up}$ of the relaxation rate $\gamma_{osc}$ to the correction rate $\gamma_{up}$, within the limit where $\gamma_{up}$ is high compared to $\gamma_{osc}$. It is within this limit that the method of stabilizing the predetermined parity is effective.

For a successive gain of two bosons to occur, it is necessary to gain a first boson by the alteration process 102, then for example gain a second boson by the correction process 101 before the loss of a boson by the relaxation process 100 occurs.

The probability that the second boson is gained before the relaxation process acts is equal to $$1 - \frac{\gamma_{osc}}{\gamma_{up}},$$

within the limit where $\gamma_{up}$ is high compared to $\gamma_{osc}$.

The correction process 101 does not correct an error caused by the alteration process 102, but on the contrary leads, with a high probability, to the addition of a second boson, which generates a logical error.

Selectivity

The present invention allows significantly increasing the ratio $\gamma_{up}/\bar{\gamma}_{up}$ of the alteration rate to the correction rate. This ratio may be called selectivity of the error correction protocol.

The selectivity gives the ratio of the probability of adding a boson when it is desirable, i.e. when the number of bosons is odd, to the probability of adding a boson when it is not desirable, i.e. when the number of bosons is even.

The greater the selectivity, the more the protocol will correct the errors due to the relaxation channel 100 by adding a boson when the number of bosons is odd, without adding a boson when the number of bosons is even.

Quantum State Stabilization System

Figure 2:
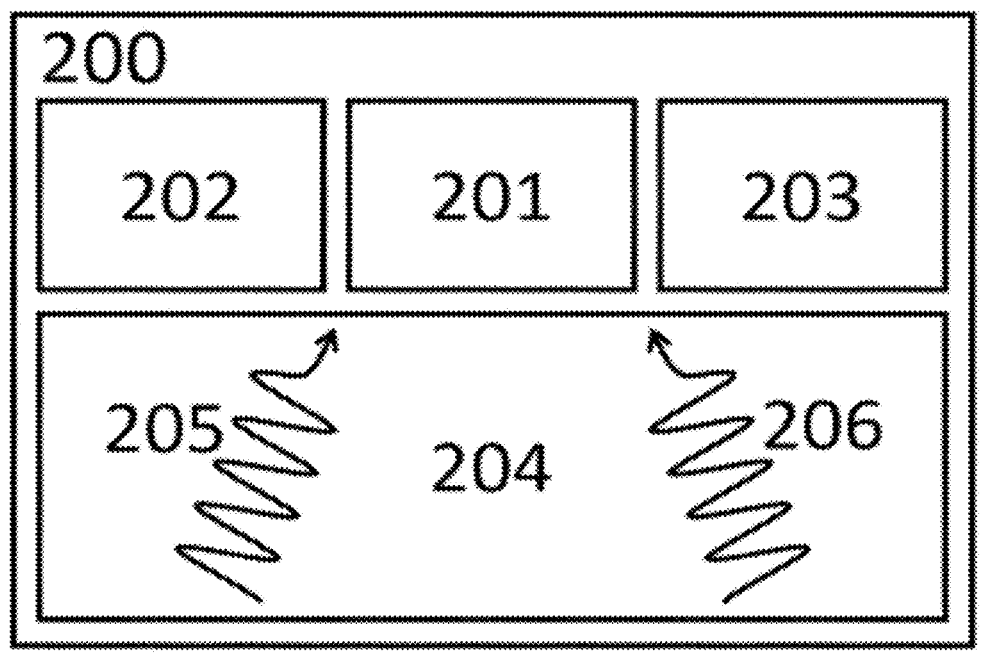
FIG. 2 is a schematic representation of a quantum state stabilization system.

A quantum state stabilization system 200 configured to implement a quantum error correction protocol is schematically represented in FIG. 2.

The system 200 comprises a quantum harmonic oscillator 202, a non-linear auxiliary device 201 which is dispersively coupled to the quantum harmonic oscillator 202.

The quantum harmonic oscillator has a resonance frequency $\omega_{osc}$. Its Hamiltonian may be represented as follows: $H_{osc} = \hbar \omega_{osc} a^+ a$ where h is Planck's reduced constant and a and $a^+$ are the creation and annihilation operators of the quantum harmonic oscillator meeting $[a, a^+] = 1$.

The harmonic oscillator is used to encode quantum information.

The auxiliary device 201 may be in a stable level |g⟩, and at least one excited level |f⟩. The transition frequency between the states |g⟩ and |f⟩ when the quantum harmonic oscillator is in its ground state is denoted $\omega_{gf}$.

The energy difference or, equivalently, the frequency difference $\omega_{gf}(k)$ between the ground state or level $|g\rangle$ and the excited state or level $|f\rangle$ linearly depends on the number k of bosons in the quantum harmonic oscillator (cf. BLAIS Alexandre et al. "*Cavity quantum electrodynamics for superconducting electrical circuits: An architecture for quantum computation*", Physical Review A vol. 69, page 062320). Such an energy difference $\omega_{gf}(k)$ man be characterized by a frequency shift $\chi$ in the form $\omega_{gf}(k)=\omega_{gf}+k\times\chi$. The frequency difference $\omega_{gf}(k)$ between the ground state $|g\rangle$ and the excited state $|f\rangle$ linearly depends on the frequency shift $\chi$ and the number of bosons in the oscillator. The frequency shift $\chi$ is equal to the difference between the energy difference between the excited level $|f\rangle$ and the stable level $|g\rangle$ for a number k+1 of bosons and the energy difference between the excited level $|f\rangle$ and the stable level $|g\rangle$ for a number k of bosons. The frequency shift $\chi$ may be positive or negative.

The auxiliary device 201 may enable an action that depends on the parity of the number of bosons.

The dispersive Hamiltonian may be represented as follows:

$$H_d = h_\chi a^+ a |f\rangle\langle f|$$

where a and $a^+$ are the creation and annihilation operators of the quantum harmonic oscillator meeting $[a, a^+]=1$.

The system 200 also comprises a dissipator 203, comprising at least two levels or states, one of which, the level or state $|0\rangle$, is stable and the other one, the level or state $|1\rangle$ is an excited state spontaneously relaxes into $|0\rangle$. The energy difference between these two states corresponds to a transition frequency $\omega_{dis}$ between the states $|0\rangle$ and $|1\rangle$. The spontaneous relaxation (or de-energization) from the level $|1\rangle$ into the level $|0\rangle$ occurs with a de-energization rate $\gamma_{dis}$, which is equal to the probability of switching from the level $|1\rangle$ into the level $|0\rangle$ per unit of time.

The spontaneous relaxation from the level $|1\rangle$ to the level $|0\rangle$ may allow making population displacements irreversible during the correction protocol.

Each energy level of the system 200 is denoted $|k, \psi, n\rangle$ and depends on:
- the energy level $|k\rangle$ of the quantum harmonic oscillator 202, k denoting the number of bosons of the quantum harmonic oscillator,
- the energy level $|\psi\rangle$ of the auxiliary device 201, $|\psi\rangle$ denoting the stable level $|g\rangle$ or the excited level $|f\rangle$, and
- the energy level $|n\rangle$ of the dissipator 203, $|n\rangle$ denoting the stable level $|0\rangle$ or the level $|1\rangle$.

The system 200 also comprises an exciter 204 configured to create two frequency combs 205 and 206. It is not necessary to take account of the state of the exciter 204 to characterize the quantum state of the system 200 which allows carrying the information in the protocol.

The frequency combs 205 and 206 generated by the exciter 204 are sent to at least one amongst the quantum harmonic oscillator 202, the non-linear auxiliary device 201 and the dissipator 203.

The frequency combs are in resonance with some transitions of the energy levels of the system 200 so as to add a boson in the harmonic oscillator if the integer k does not have the predetermined parity.

The frequency difference separating two successive lines of the first frequency comb is equal to twice a second frequency difference separating two successive lines of the second comb.

In this manner, it is possible to temporally separate the action of the first comb and the action of the second comb. In particular, this enables a finer control of the population transfers between the different energy levels of the system 200. This decreases the alteration channel 102. The alteration channel is even potentially completely suppressed in the absence of other parasitic effects, for example, like the thermal excitations of the auxiliary device.

Level Architecture and Frequency Combs

For each integer k of a set of integers, the system 200 may be configured to be in:
- a first level defined by a first number of bosons equal to the integer k, the ground state $|g\rangle$ and the ground state $|0\rangle$,
- a second level defined by a second number of bosons equal to the integer k+1, the excited state $|g\rangle$ and the ground state $|0\rangle$,
- a third level in which the auxiliary device is in the excited state $|f\rangle$ and the dissipator is in the stable state $|0\rangle$,
- a fourth level in which the auxiliary device is in the ground state $|g\rangle$ and the dissipator is in the excited state $|1\rangle$.

For each integer k of the set of integers, the third level is defined by a number of bosons equal to the integer k+p, where p is a positive or negative integer.

For each integer k of the set of integers, the fourth level is defined by a number of bosons equal to the integer k+q, where q is a positive or negative integer.

The exciter is configured to couple, for each integer k, the first, third and fourth levels if the integer k does not have the predetermined parity, so as to switch the system from the first level into the second level.

The exciter is configured to generate first and second frequency combs so that, for each integer k:
- the first comb comprises a first line if the integer k does not have the predetermined parity, the first line having a frequency equal to a transition frequency between the first and third levels, and
- the second comb comprises a second line having a frequency equal to a transition frequency between the third and fourth levels.

In particular, the set of integers may be an interval of integers which covers the average number of bosons initially generated in the harmonic oscillator.

The set of integers may also comprise one single integer.

Figure 3:
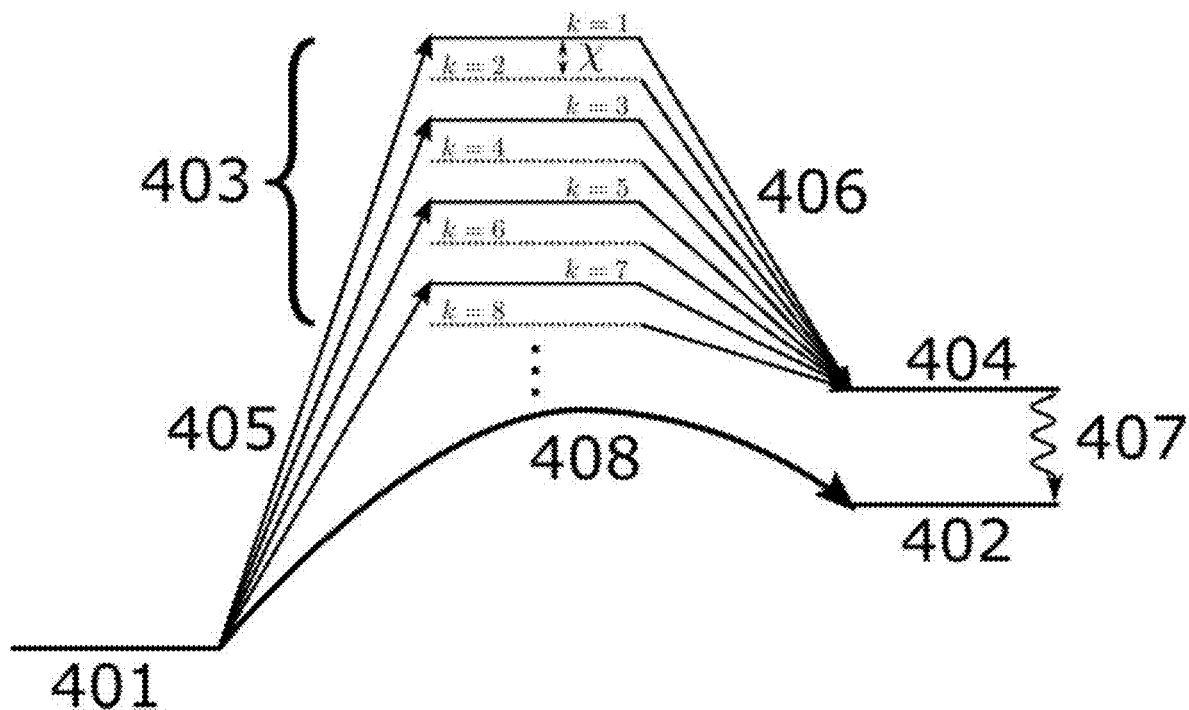
FIG. 3 is a schematic representation of an energy level architecture of a quantum state stabilization system.

FIG. 3 schematically represents an example of such an energy level architecture of the system 200 for a method for stabilizing quantum states. The energy level is represented vertically and increasing upwards. FIG. 3 represents
- the first level or state $|k, g, 0\rangle$, referenced 401, which is a state that one wishes to keep if k is even and correct by adding a boson if k is odd,
- the second level or state $|k+1, g, 0\rangle$, referenced 402,
- a plurality of third levels or states $|k+p, f, 0\rangle$, referenced 403, with p the positive or negative integer; the integer p is assumed to be positive in FIG. 3; the levels $|k+p, f, 0\rangle$ are separated vertically according to the value of k because of the dispersive coupling between the harmonic oscillator 202 and the auxiliary device 201; the frequency shift $\chi$ is assumed to be negative in this figure, and vertically separates the states $|k+p, f, 0\rangle$ corresponding to two successive values of k, a fourth level or state |k+1, g, 1⟩, referenced 404, i.e. a fourth level for which the integer q has been selected equal to 1.

The exciter is configured to generate:
- a first frequency comb 405 which enables transitions between the first level 401 and the third levels 403; it is configured to excite the auxiliary device and, possibly, shift the number of bosons of the quantum harmonic oscillator by "p"; if p is positive bosons are added by the first comb 405, if p is negative bosons are removed by this comb.
- a second comb 406 which enables transitions between the third levels 403 and the fourth level 404; it is configured to de-energize the auxiliary device, excite the dissipator, and shift the number of bosons so that the fourth level has an additional boson relative to the first level.

The state |k+1, g, 1⟩ 404 spontaneously de-energizes into the state |k+1, g, 0⟩ 402 thanks to the spontaneous relaxation from the level |1⟩ to the level |0⟩ according to the de-energization rate $\gamma_{dis}$. This de-energization is represented by a wavy arrow 407.

The exciter generates the first and second frequency combs so that a first frequency difference separating two successive lines of the first frequency comb is equal to twice a second frequency difference separating two successive lines of the second comb.

The first frequency difference separating two successive lines of the first frequency comb is equal to twice the frequency shift $\chi$ and is equal to twice the second frequency difference separating two successive lines of the second comb.

The effect of this difference in the frequency difference is to reduce the alteration channel 102 which corresponds to the addition of bosons in the harmonic oscillator when the latter comprises a number of bosons having the predetermined parity.

The first frequency comb 405 comprises frequency lines which are in resonance with the transitions from a level |k, g, 0⟩ 401 into a level |k+p, f, 0⟩ 403, only when the level |k, g, 0⟩ 401 corresponds to an odd number k of bosons. Hence, the first frequency comb 405 is configured to comprise frequency lines equal to the expression $p\omega_{osc}+\omega_{gf}+(k+p)\chi$, with k odd. The first frequency comb is a frequency comb whose lines are separated by a frequency interval equal to $2\chi$. The second frequency comb 406 comprises frequency lines which are in resonance with the transitions from a level |k+p, f, 0⟩ 403 into a level |k+1, g, 1⟩ 404, for values of the even and odd number k of bosons. Hence, the second frequency comb 406 is configured to comprise frequency lines equal to the expression $\omega_{dis}-(p-1)\omega_{osc}-\omega_{gf}-(k+p)\chi$, with k even or odd.

The second frequency comb is a frequency comb whose lines are separated by a frequency interval equal to $\chi$.

The frequency combs 405 and 406 allow carrying out a transfer 408 corresponding to the correction channel 101 to switch the state of the system from the level |k, g, 0⟩ 401 in the level |k+1, g, 0⟩ 402, when k is odd.

The coupling Hamiltonian corresponding to the action of the first frequency comb 405 may be formulated as follows in interaction representation:

$$H_1^{(I)} = h\sum_k m_1^{(I)}(k,t) a_k |k+p, f, 0\rangle\langle k, g, 0| +$$

$$h\sum_k [m_1^{(I)}(k,t)]^* a_k^* |k, g, 0\rangle\langle k+p, f, 0|$$

The term $\Sigma_k$ refers to a sum over the integers k.

The function $m_1^{(I)}(k,t)$ characterizes the temporal evolution in interaction representation of the first frequency comb 405 generated by the exciter 204. This function depends on the number of bosons k because the interaction representation could be seen in a first approximation as a change of reference frame, the reference frame depending on the number of bosons k in the quantum harmonic oscillator.

The coefficients $a_k$ are complex numbers depending on how the first frequency comb 405 couples to the system 200.

The function $m_1^{(I)}(k,t)$ of the first frequency comb 405 may be formulated in the following form:

$$m_1^{(I)}(k,t) = \sum_{k'} m_{1,k'} e^{-i(k-2k'-1)\chi t}$$

wherein $m_{1,k'}$ is a complex number characterizing the line k' of the first comb. The frequency of the line k' of the first comb is equal to $p\omega_{osc}+\omega_{gf}+(2k'+1+p)\chi$. The amplitude of $m_{1,k'}$ is a coupling frequency characterizing the amplitude of the line k' of the first comb. The phase of $m_{1,k'}$ is a phase characterizing the phase of the line k' of the first comb.

The term $\Sigma_{k'}$ refers to a sum over the integer k' which may be positive, negative or zero.

The coupling Hamiltonian corresponding to the action of the second frequency comb 406 may be formulated as follows in interaction representation:

$$H_2^{(I)} = h\sum_k m_2^{(I)}(k,t) b_k |k+1, g, 1\rangle\langle k+p, f, 0| +$$

$$h\sum_k [m_2^{(I)}(k,t)]^* b_k^* |k+p, f, 0\rangle\langle k+1, g, 1|$$

The function $m_2^{(I)}(k,t)$ characterizes the temporal evolution in interaction representation of the second frequency comb 406 generated by the exciter 204. This function depends on the number of bosons k because the interaction representation could be seen in a first approximation as a change of reference frame, the reference frame depending on the number of bosons k in the quantum harmonic oscillator.

The coefficients $b_k$ are complex numbers depending on how the second frequency comb 406 couples to the system 200.

The function $m_2^{(I)}(k,t)$ of the second frequency comb 406 may be formulated in the following form:

$$m_2^{(I)}(k,t) = \sum_{k'} m_{2,k'} e^{-i(k-k')\chi t}$$

wherein $m_{2,k'}$ is a complex number characterizing the line k' of the second comb. The frequency of the line k' of the second comb is equal to $\omega_{dis}-(p-1)\omega_{osc}-\omega_{gf}-(k'+p)\chi$. The amplitude of $m_{2,k'}$ is a coupling frequency characterizing the amplitude of the line k' of the second comb. The phase of $m_{2,k'}$ is a phase characterizing the phase of the line k' of the second comb.

Figure 4:
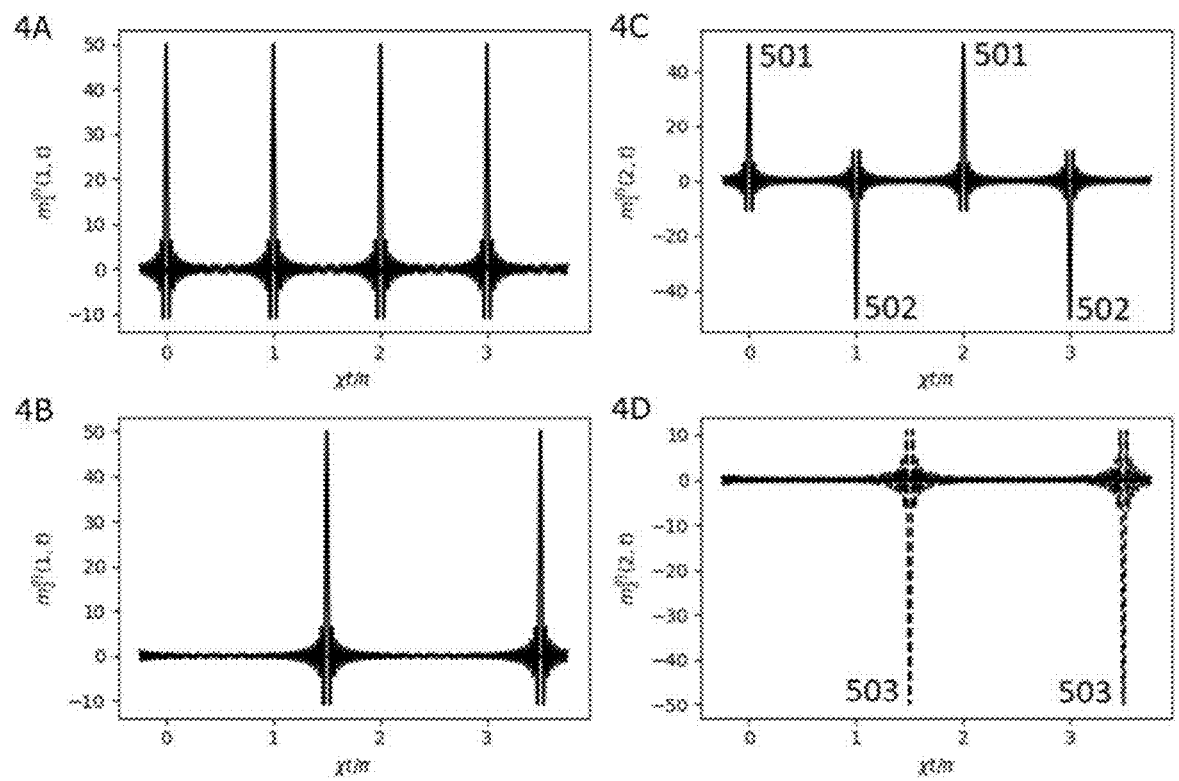
FIG. 4 is a schematic representation of functions characterizing the temporal evolution of frequency combs generated by the quantum state stabilization system.

The effect of the difference in the frequency difference between the first frequency comb 405 and the second frequency comb 406 could be understood from the time dependence in interaction representation of the first comb $m_1^{(I)}(k,t)$ and of the second comb $m_2^{(I)}(k,t)$ in the cases where k=1 and k=2, with reference to FIG. 4.

FIG. 4 comprises four graphs 4A, 4B, 4C and 4D, respectively schematically representing the functions $m_1^{(I)}(1, t)$, $m_2^{(I)}(1, t)$, $m_1^{(I)}(2, t)$ and $m_2^{(I)}(2, t)$. For this example and to simplify the study, it has been assumed that:

$$m_{1,k'}\begin{cases} 1, & \text{if } -50 < 2k' + 1 < 50 \\ 0, & \text{otherwise} \end{cases}$$

$$m_{2,k'}\begin{cases} e^{ik'\chi/8}, & \text{if } -50 < k' < 50 \\ 0, & \text{otherwise} \end{cases}$$

The function $m_1^{(I)}(1, t)$ allows understanding the coupling between the level |k, g, 0⟩ 401 and the level |k+p, f, 0⟩ 403, when k=1, i.e. in a situation where k is odd.

The function $m_1^{(I)}(2, t)$ allows understanding the coupling between the level |k, g, 0⟩ 401 and the level |k+p, f, 0⟩ 403, when k=2, i.e. in a situation where k is even.

The function $m_2^{(I)}(1, t)$ allows understanding the coupling between the level |k+p, f, 0⟩ 403 and the level |k+1, g, 1⟩ 404, when k=1, i.e. in a situation where k is odd.

The function $m_2^{(I)}(2, t)$ allows understanding the coupling between the level |k+p, f, 0⟩ 403 and the level |k+1, g, 1⟩ 404, when k=2, i.e. in a situation where k is even.

In these graphs 4A-4D, the solid lines represent the real part and the dashed lines the imaginary part of the functions $m_1^{(I)}(1, t)$, $m_1^{(I)}(2, t)$, $m_2^{(I)}(1, t)$ and $m_2^{(I)}(2, t)$.

If in the frequency domain a frequency comb consists of lines evenly separated by a frequency difference, in the time domain this frequency comb consists of peaks separated by a time difference inversely proportional to the frequency difference. The term line is used for the frequency domain and the term peak for the time domain.

In the graph 4A, the real part of $m_1^{(I)}(1, t)$ features peaks evenly spaced apart by a time interval equal to $\pi/\chi$. These are the peaks composing the first frequency comb in its temporal representation. The successive peaks are identical.

The effect associated with each peak of $m_1^{(I)}(1, t)$ is to transfer part of the population from the first level |k, g, 0⟩ 401 to the third level |k+p, f, 0⟩ 403.

In the graph 4B, the real part of $m_2^{(I)}(1, t)$ features peaks evenly spaced apart by a time interval equal to $2\pi/\chi$. These are the peaks composing the second frequency comb in its temporal representation. The successive peaks are identical.

The effect associated with each peak of $m_2^{(I)}(1, t)$ is to transfer part of the population from the third level |k+p, f, 0⟩ 403 to the fourth level |k+1, g, 1⟩ 404.

The combined effect of the peaks of $m_1^{(I)}(1, t)$ and $m_2^{(I)}(1, t)$ is, as expected, to make the correction channel 101, i.e. to add a boson in the harmonic oscillator when the latter initially contains an odd number of bosons, in this case an odd number equal to one.

In the graph 4C, the real part of $m_1^{(I)}(2, t)$ features peaks evenly spaced apart by a time interval equal to $\pi/\chi$. Unlike the peaks of $m_1^{(I)}(1, t)$ which are all of the same sign, the peaks of $m_1^{(I)}(2, t)$ have alternate signs. More specifically, two successive peaks (501 and 502 in FIG. 5) have different signs.

In the graph 4D, the imaginary part of $m_2^{(I)}(2, t)$ features peaks 503 evenly spaced apart by a time interval equal to $2\pi/\chi$.

The effect associated with each positive peak 501 of $m_1^{(I)}(2, t)$ is to perform a transfer of part of the population from the first level |k, g, 0⟩ 401 into the third level |k+p, f, 0⟩ 403, and the effect associated with each negative peak 502 of $m_1^{(I)}(2, t)$ is to perform the exactly opposite transfer, meaning a rotation by an exactly opposite angle in Bloch's sphere, of part of the population from the third level |k+p, f, 0⟩ 403 into the first level |k, g, 0⟩ 401.

The effect associated with each peak 503 of $m_2^{(I)}(2, t)$ is to perform a transfer of part of the population from the third level |k+p, f, 0⟩ 403 to the fourth level |k+1, g, 1⟩ 404.

In the case of FIG. 4, $m_1^{(I)}(2, t)$ features a difference between its peaks equal to $\pi/\chi$, while $m_2^{(I)}(2, t)$ features a difference between its peaks equal to $2\pi/\chi$. This double time difference is the consequence of the fact that the lines of the first frequency comb 405 are spaced apart by a frequency difference equal to twice the frequency difference of the lines of the second frequency comb 406. In this manner, a positive peak 501/negative peak 502 pair of $m_1^{(I)}(2, t)$ always lies between two successive peaks 503 of $m_2^{(I)}(2, t)$. Thus, the action of the first positive peak 501 of the first comb is canceled by the action of the second negative peak 502. Since there is no peak 503 of the second comb over the time interval separating these two peaks of the first comb, the second comb does not interfere with the first comb over this interval. This allows reducing the alteration channel 102. The alteration channel is even potentially completely suppressed in the absence of other parasitic effects, for example, like the thermal excitations of the auxiliary device.

Time Shift Between the Frequency Combs

It is possible to configure the exciter so that it generates the first and the second frequency combs with the peaks of the first comb time-shifted with respect to the peaks of the second comb.

The frequency difference between two successive lines of the first frequency comb is equal to $2\chi$ and the frequency difference separating two successive lines of the second comb is equal to $\chi$.

The time shift may be characterized by the duration D separating a negative peak 502 of the first frequency comb 405 and the first peak 503 of the second frequency comb 406 which temporally follows the negative peak 502.

The time shift D may be selected freely within the interval $$\left[0; \frac{2\pi}{\chi}\right].$$

Advantageously, the time shift D may be selected within the interval $$\left[\frac{\delta_1 + \delta_2}{2}; \frac{\pi}{\chi} - \frac{\delta_1 + \delta_2}{2}\right]$$

or the interval $$\left[\frac{\pi}{\chi} + \frac{\delta_1 + \delta_2}{2}; \frac{2\pi}{\chi} - \frac{\delta_1 + \delta_2}{2}\right]$$

where $\delta_1$ and $\delta_2$ respectively refer to the mid-height width of the peaks of the first comb and of the second comb.

As explained before, if the frequency difference of the first comb is twice the frequency difference of the second comb, then there is a difference between peaks of the function $m_2^{(I)}(k,t)$ twice that of the function $m_1^{(I)}(k,t)$.

If the peaks of the first frequency comb 405 are time shifted relative to the peaks of the second frequency comb 406, then there is no temporal coincidence between a peak of the first frequency comb 405 and a peak of the second frequency comb 406.

In this manner, there is no peak 503 of the second frequency comb 406 over the time interval separating a peak 501 from the next peak 502 of the first frequency comb 405.

The effect of the peak 501 of the first frequency comb 405 is canceled by the effect of the next peak 502 of the first frequency comb 405, so that when reaching the peak 503 of the second frequency comb 406, there is no population in the level |k+p, f, 0⟩ 343 that this peak can transfer to the level |k+1, g, 1⟩ 404 when the number of bosons k is even.

Without temporal coincidence between a peak of the first frequency comb 405 and a peak of the second frequency comb 406, there also could not be a population transfer from the level |k, g, 0⟩ 401 to the level |k+p, f, 0⟩ 403 by the peak of the first comb which is simultaneously transferred to the level |k+1, g, 1⟩ 404 by the peak of the second frequency comb 406.

The alteration channel 102 is further decreased by this characteristic of non-coincidence of the peaks of the first and second frequency combs.

Number of Lines in the Frequency Combs

As described before, the first frequency comb 405 comprises frequency lines which are in resonance with the transitions of the first level |k, g, 0⟩ 401 at the third level |k+p, f, 0⟩ 403, only when the level |k, g, 0⟩ 401 corresponds to an odd number k of bosons. These lines are at the frequencies $p\omega_{osc}+\omega_{gf}+(2k'+1+p)\chi$ where k' is an integer numbering the line. They are separated by a frequency interval equal to $2\chi$.

If the error correction code requires the stabilization of the Fock's states with an even parity with a number of bosons comprised between an even floor integer $k_{min}$ and an even ceiling integer $k_{max}$, then the set of integers is equal to the integers comprised between the integers $k_{min}-1$ and $k_{max}-1$.

In this case, the first frequency comb 405 should comprise at least the lines corresponding to the integers k', such that $2k'+1=k_{min}-1, k_{min}+1, \ldots, k_{max}-3, k_{max}-1$.

This is the case in particular when the information is encoded in states of the oscillator corresponding to a number of bosons comprised between an even floor integer $k_{min}$ and an even ceiling integer $k_{max}$.

Advantageously, the first frequency comb 405 may comprise more lines and in particular comprise the lines k', such that $2k'+1=k_1, k_1+1, \ldots, k_2-2, k_2$ where $k_1$ is an odd integer less than $k_{min}-1$ and $k_2$ is an odd integer greater than $k_{max}-1$. The number $k_1$ may be negative.

In this manner, the first frequency comb 405 comprises no resonant line between the first level 401 and the plurality of third levels 403 when the number of bosons k of the first level 401 is even.

The greater the number of lines comprised in the first frequency comb 405, the better will be the definition of the peaks 501 and 502 of its representation in the time domain. In particular, this allows facilitating and improving the condition of non-coincidence between the peaks 501 and 502 of the first frequency comb 405 and the peaks 503 of the second frequency comb 406.

As described before, the second frequency comb 406 comprises frequency lines that are in resonance with the transitions of the third level |k+p, f, 0⟩ 403 at the fourth level |k+1, g, 1⟩ 404, when the number k is even or odd. These lines are found at the frequencies $\omega_{dis}-(p-1)\omega_{osc}-\omega_{gf}-(k'+p)\chi$ where k' is an integer numbering the line. They are separated by a frequency interval equal to $\chi$.

If the error correction code requires the stabilization of the Fock's states with an even parity having a number of bosons comprised between the even floor integer $k_{min}$ and the even ceiling integer $k_{max}$, then the second frequency comb 406 should comprise at least the lines $k'=k_{min}-1, k_{min}, \ldots, k_{max}-2, k_{max}-1$.

Advantageously, the second frequency comb 406 may comprise more lines and in particular comprise the lines $k'=k_3, k_3+1, \ldots, k_4-1, k_4$ where $k_3$ is an even or odd integer less than $k_{min}-1$ and $k_4$ is an even or odd integer greater than $k_{max}-1$. The number $k_3$ may be negative.

In this manner, the second frequency comb 406 always comprises temporal peaks 503 spaced apart by a time difference twice the time difference between the peaks 501 and 502 of the first frequency comb 405. The greater the number of lines in the second frequency comb 406, the better will be the definition of the peaks 503 of its representation in the time domain. In particular, this allows facilitating and improving the condition of non-coincidence between the peaks 501 and 502 of the first frequency comb 405 and the peaks 503 of the second frequency comb 406.

Amplitude of the Lines of the Frequency Combs

Each peak 501, 502 of the first frequency comb 405 or each peak 503 of the second frequency comb 406 causes a transfer of population between levels of the architecture as these have been presented hereinabove. An interesting regime is obtained when each of the transfer caused by the two successive peaks 501 and 502 and the transfer caused by the peak 503 corresponds to a rotation in the Bloch sphere whose angle is smaller than $\pi$.

This regime corresponds to having combs whose coupling frequencies $|m_{1,k'}|$ and $|m_{2,k'}|$ characterizing the amplitudes of the frequency lines are lower than the quarter of the second frequency difference separating two successive lines of the second frequency comb 406.

This regime being characterized by lines having low amplitudes, therefore by an exciter sending combs having a reduced power, it is easier to carry out experimentally and is less likely to cause undesirable effects such as a heat-up of the system, the saturation of its non-linear components or the apparition of harmonics.

In addition, in this regime, there is a unique maximum of the lifetime of the states having an even number of bosons according to the coupling frequencies $|m_{1,k'}|$ and $|m_{2,k'}|$.

Indeed, increasing these frequencies allows increasing the effective transfer rate 408 from the first level 401 to the second level 402 when the number of bosons k in the first level is odd. This results in an increase in the correction rate of the correction process 101.

However, as mentioned before, experimental imperfections could make the effective transfer rate 408 from the first to the second level non-zero when the number of bosons k in the first level is even. In this case, increasing the coupling frequencies $|m_{1,k'}|$ and $|m_{2,k'}|$ also results in an increase in the alteration rate of the alteration process 102.

It has been mentioned that the alteration process 102 could be not corrected by the correction process 101, but instead aggravated.

Thus, in the regime where the coupling frequencies $|m_{1,k'}|$ and $|m_{2,k'}|$ are lower than $\chi/4$, there is an optimal setting of the amplitude of the lines corresponding to a unique maximum of the lifetime of the states having an even number of bosons. The fact that this maximum is unique allows finding the optimal setting with certainty, both experimentally and theoretically, by an optimization algorithm, for example, like the gradient algorithm.

In particular, such an optimization of the amplitude of the lines of the first and second frequency combs, the amplitude of the lines being characterized by a coupling frequency, may be achieved by the following steps:
(E1) selecting a coupling frequency value lower than the quarter of the second frequency difference,
(E2) measuring a lifetime of the states having an even number of bosons,
(E3) modifying the value of the coupling frequency based on the lifetime measured according to an optimization algorithm of the lifetime so as to identify an optimal value of the coupling frequency corresponding to a maximum of the lifetime.

An example of an optimization algorithm consists in following these steps:
(F1) selecting an integer a greater than 2 and calculating a coupling frequency difference equal to the ratio of the quarter of the second frequency difference to the integer a,
(F2) carrying out a loop of sub-steps indexed by the integer i initially equal to one:
(F21) calculating a coupling frequency value FC(i) equal to the product of the integer i and the coupling frequency difference, the first and second frequency combs generated and sent to at least one amongst the quantum harmonic oscillator, the auxiliary device and the dissipator, having an amplitude of the lines characterized by the calculated coupling frequency value,
(F22) measuring a lifetime TV(i) of the states of the oscillator having an even number of bosons,
(F23) if i is equal to 1 replacing the integer i by the integer i+1 and repeating the steps F21 and F22, else
(F24) when TV(i−1) is lower than TV(i), replacing the integer i by the integer i+1 and repeating the steps F21 to F24, else
(F3) stopping the loop of sub-steps and returning on an interface the coupling frequency value FC(i−1) corresponding to a maximum lifetime TV(i−1) of the states of the oscillator.

In particular, the interface may be an input and output interface enabling the input of data or returning the results of a process.

It should be noted that the greater the integer a, the better will be the accuracy of the desired frequency of the coupling corresponding to the maximum lifetime. However, at least because of the measurement error of the lifetime, there is an integer a beyond which the application of the previous steps does not improve the accuracy on the desired frequency of the coupling.

Relaxation Rate of the Dissipator

The effective transfer rate 308 is ultimately limited by the de-energization rate $\gamma_{dis}$, equal to the probability of switching from the level |0⟩ of the dissipator to the level |1⟩ per unit of time.

As a result, the correction rate $\gamma_{up}$ is necessarily lower than the de-energization rate $\gamma_{dis}$ Hence, increasing $\gamma_{dis}$ allows increasing the correction rate $\gamma_{up}$.

However, by virtue of Heisenberg's time.energy uncertainty relationship, increasing $\gamma_{dis}$ results in a widening of the third level 403 proportional to $h\gamma_{dis}/2$. When this widening is in the range of the amount $h\chi$, the levels corresponding to an even or odd number of bosons overlap.

This overlap may potentially increase the alteration rate $\bar{\gamma}_{up}$, and affect selectivity.

In the aforementioned regime where the coupling frequencies $|m_{1,k}|$ and $|m_{2,k}|$ are lower than the quarter of the second frequency difference separating two successive lines of the second frequency comb 406, the simultaneous increase in the correction rate $\gamma_{up}$ and in the alteration rate $\bar{\gamma}_{up}$ with $\gamma_{dis}$ results in the existence of a unique maximum in the lifetime of the states having an even number of bosons according to $\gamma_{dis}$.

The fact that this maximum is unique allows finding with certainty the optimal value of $\gamma_{dis}$, both experimentally and theoretically, by an optimization algorithm, for example, like the gradient algorithm.

In particular, such an optimization of the de-energization rate $\gamma_{dis}$ may be achieved by carrying out the following steps:
(S1) selecting a value of the de-energization rate lower than the second frequency difference,
(S2) measuring a lifetime of the states having an even number of bosons,
(S3) modifying the value of the de-energization rate based on the lifetime measured according to an optimization algorithm of the lifetime so as to identify an optimal value of the de-energization rate corresponding to a maximum of the lifetime.

An example of an optimization algorithm consists of following the steps:
(T1) selecting an integer b greater than 2 and calculating a de-energization rate difference equal to the ratio of the second frequency difference to the integer b,
(T2) carrying out a loop of sub-steps indexed by the integer i initially equal to one:
(T21) calculating a value TD(i) of the de-energization rate equal to the product of the integer i by the de-energization rate difference, the auxiliary device being coupled to the dissipator configured to switch from an excited state |1⟩ to a ground state |0⟩ according to a de-energization rate equal to the value TD(i),
(T22) measuring a lifetime TV(i) of the states of the oscillator having an even number of bosons,
(T23) if i is equal to 1 replacing the integer i by the integer i+1 and repeating the steps T21 and T22, else
(T24) when TV(i−1) is lower than TV(i), replacing the integer i by the integer i+1 and repeating the steps T21 to T24, else
(T3) stopping the loop of sub-steps and returning on an interface the value TD(i−1) of the de-energization rate corresponding to a maximum lifetime TV(i−1) of the states of the oscillator In particular, the interface may be the aforementioned interface for searching the coupling frequency corresponding to the maximum lifetime.

It should be noted that the greater the integer b, the better will be the accuracy of the desired de-energization rate corresponding to the maximum lifetime.

However, at least because of the measurement error of the lifetime, there is an integer b beyond which the application of the previous steps does not improve the accuracy on the desired de-energization rate.

Other Possible Level Architectures

So far, it has been proposed to use the first level or state |k, g, 0⟩, referenced 401, a plurality of third levels or states |k+p, f, 0⟩, referenced 403, a fourth level |k+1, g, 1⟩, referenced 404, and a second level |k+1, g, 0⟩, referenced 402.

More generally, it is possible to use a fourth level including a number of bosons k+q different from k+1, with q a positive or negative integer. When the integer q is different from 1, the switch from the state |1⟩ to state |0⟩ of the dissipator with the rate $\gamma_{dis}$ is then accompanied by a shift q−1 in the number of bosons.

In this case, the frequencies of the lines of the second comb are equal to $\omega_{dis}-(p-q)\omega_{osc}-\omega_{gf}-(k'+p)\chi$ where k' is an integer.

Superconducting Circuit Technology

The stabilization method described herein may, for example, be carried out using the superconducting circuit technology.

The quantum harmonic oscillator may then be a superconducting microwave resonator.

The auxiliary system may be a transmon.

The dissipator may be another superconducting microwave resonator having a poor quality factor in comparison with the oscillator.

In this case, the Hamiltonian of the system may be written as follows:

$$H = \hbar\omega_{osc}a^+a + \hbar\omega_0 b^+b - \frac{\hbar K}{2}b^+b^+bb + \hbar\chi_0 a^+ab^+b + \hbar\omega_{dis}c^+c$$

where $\omega_{osc}$ is the resonance frequency of the superconducting microwave resonator acting as the quantum harmonic oscillator encoding the logical qubit; a, $a^+$ are its creation and annihilation operators meeting $[a, a^+]=1$; $\omega_0$ is the fundamental transition frequency of the transmon; K its anharmonicity; b, $b^+$ are its creation and annihilation operators meeting $[b, b^+]=1$; $\omega_{dis}$ is the resonance frequency of the superconducting microwave resonator acting as the dissipator; c, $c^+$ are its creation and annihilation operators meeting $[c, c^+]=1$; $\chi_0$ is a frequency shift of the first excited level of the transmon per added boson in the quantum harmonic oscillator.

In addition, the operators of the three components of the tripartite system commute:

$$[a, b] = [a^+, b^+] = [a, b^+] = [a^+, b] = [a, c] =$$
$$[a^+, c^+] = [a, c^+] = [a^+, c] = [c, b] = [c^+, b^+] = [c, b^+] = [c^+, b] = 0$$

The relaxation process 100 of the quantum harmonic oscillator and the de-energization process 407 of the dissipator may be described, respectively, by the following jump operators:

$$L_{osc} = \sqrt{\gamma_{osc}}\, a,\ L_{dis} = \sqrt{\gamma_{dis}}\, c$$

Where $\gamma_{osc}$ is the relaxation rate and $\gamma_{dis}$ is the de-energization rate.

The state $|k\rangle$ of the quantum harmonic oscillator corresponds to the state containing k photons in the superconducting microwave resonator. The states $|0\rangle$ and $|1\rangle$ of the dissipator correspond to the states containing respectively 0 and 1 photon in the superconducting microwave resonator having a poor quality factor. The state $|g\rangle$ of the auxiliary device corresponds to the ground state of the transmon ($b^+b|g\rangle=0$). The state $|f\rangle$ may correspond to an excited state amongst several excited states of the transmon.

It is possible to obtain different embodiments by varying:
the excited state of the transmon chosen to play the role of the state $|f\rangle$, and
the value of the integer p which defines the plurality of the third levels or states $|k+p, f, 0\rangle$.

Table 1 lists three embodiments corresponding to a particular excited state $|f\rangle$/integer p pair. Once this pair is set, it is possible to deduce, for each mode, the expressions of the terms $h_1$, $h_2$, $c_k$, $d_k$, p, $\omega_{gf}$ and $\chi$. These terms have been introduced previously with the exception of the terms $h_1$ and $h_2$ which are such that $H_1=g_1(t)h_1+g_1^+(t)h_1^+$ and $H_2=g_2(t)h_2+g_2^+(t)h_2^+$, with $g_1(t)$ and $g_2(t)$ the functions respectively defining the first and second frequency combs in Schrödinger representation.

TABLE 1

Examples of Embodiments of the level architecture for the parity stabilization protocol

| Excited level of the transmon $|f\rangle$ | Mode 1 $b^+b|f\rangle_1 = 2|f\rangle_1$ | Mode 2 $b^+b|f\rangle_2 = |f\rangle_2$ | Mode 3 $b^+b|f\rangle_3 = |f\rangle_3$ |
|---|---|---|---|
| p | 1 | 1 | 0 |
| q | 1 | 1 | 1 |
| $h_1$ | $a^+b^+b^+$ | $a^+b^+$ | $b^+$ |
| $h_2$ | $bbc^+$ | $bc^+$ | $a^+bc^+$ |
| $c_k$ | $\sqrt{2(k+1)}$ | $\sqrt{k+1}$ | 1 |
| $d_k$ | $\sqrt{2}$ | 1 | $\sqrt{k+1}$ |
| $\omega_{gf}$ | $2\omega_0 - K$ | $\omega_0$ | $\omega_0$ |
| $\chi$ | $2\chi_0$ | $\chi_0$ | $\chi_0$ |

The excited state $|f\rangle$ is defined in Table 1 as the natural state of the operator $b^+b$.

By selecting other excited state $|f\rangle$/integer p pairs, it is possible to determine other embodiments.

Depending on the expression of $h_1$ and of $h_2$ obtained by the selection of the excited state $|f\rangle$/integer p pair, the embodiment is more or less simple to carry out.

In the case where the expression of an operator $h_1$ or $h_2$ involves the product of one or three creation and annihilation operator(s) a, $a^+$, b, $b^+$, c and $c^+$, this operator may be obtained by generating by the exciter a microwave signal exciting the transmon (cf. for example the aforementioned document by GERTLER Jeffrey M. and PECHAL M. et al. "*Microwave-Controlled Generation of Shaped Single Photons in Circuit Quantum Electrodynamics*" Physical Review X, Vol. 4, page 041010) and having lines at the frequencies:

$p\omega_{osc}+\omega_{gf}+(2k'+1+p)\chi$ for an operator $h_1$ i.e. for the first comb, and $\omega_{dis}-(p-1)\omega_{osc}-\omega_{gf}-(k'+p)\chi$ for an operator $h_2$ i.e. for the second comb.

In the case where the expression of an operator $h_1$ or $h_2$ involves the product of two creation and annihilation operators a, $a^+$, b, $b^+$, c and $c^+$, this operator may be obtained by generating by the exciter two microwave signals exciting the transmon, as disclosed in CAMPAGNE-IBARCQ P. et al. "*Deterministic Remote Entanglement of Superconducting Circuits through Microwave Two-Photon Transitions*", Physical Review Letters Vol. 120 page 200501.

For an operator $h_1$ involving the product of two creation and annihilation operators, the two microwave signals should have a product that is a signal having lines at the frequencies $p\omega_{osc}+\omega_{gf}+(2k'+1+p)\chi$.

For example, the two microwave signals may be:
on the one hand a frequency comb comprising the lines (where $\Delta$ is a constant frequency): $p\omega_{osc}+\omega_{gf}+(2k'+1+p)\chi-\Delta$, and
on the other hand a monochromatic signal at the frequency $\Delta$.

For an operator $h_2$ involving the product of two creation and annihilation operators, the two microwave signals should have a product that is a signal having lines at the frequencies $\omega_{dis}-(p-1)\omega_{osc}-\omega_{gf}-(k'+p)\chi$.

For example, the two microwave signals may be:
on the one hand a frequency comb comprising the lines (where $\Delta$ is a constant frequency): $\omega_{dis}-(p-1)\omega_{osc}-\omega_{gf}-(k'+p)\chi-\Delta$, and
on the other hand a monochromatic signal at the frequency $\Delta$.

The invention claimed is:

1. A system (200) for autonomous stabilization of quantum states comprising:
a quantum harmonic oscillator (202) configured to carry information encoded in states of the oscillator having a predetermined parity of a number of bosons comprised in the harmonic oscillator (202),
an auxiliary device (201) configured to be in a ground state |g> or in an excited state |f> among a plurality of excited states, the device (201) being dispersively coupled to the oscillator (202), so that a frequency difference between the ground state |g> and the excited state |f> depends linearly on a frequency shift $\chi$ and on the number of bosons,
a dissipator (203) configured to switch from an excited state |1> to a ground state |0>,
an exciter (204) configured to generate first (205, 405) and second (206, 406) frequency combs, intended to be sent to at least one of the quantum harmonic oscillator (202), the auxiliary device (201) and the dissipator (203) so as to add a boson in the harmonic oscillator (202) if the number of bosons does not have the predetermined parity, characterized in that a first frequency difference separating two successive lines of the first frequency comb (205, 405) is equal to twice the frequency shift $\chi$ and is equal to twice a second frequency difference separating two successive lines of the second comb (206, 406).

2. The system according to claim 1, wherein the first and second combs have peaks in the time domain, the peaks of the first comb being time-shifted relative to the peaks of the second comb.

3. The system according to claim 1 or 2, further configured to be, for each integer k of a set of integers, in:
a first level (401) defined by a first number of bosons equal to the integer k, the ground state |g> and the ground state |0>,
a second level (402) defined by a second number of bosons equal to the integer k+1, the excited state |g> and the ground state |0>,
a third level (403) in which the auxiliary device is in the excited state |f> and the dissipator is in the stable state |0>,
a fourth level (404) in which the auxiliary device is in the ground state |g> and the dissipator is in the excited state |1>, the exciter (204) being configured to couple, for each integer k, the first, third and fourth levels if the integer k does not have the predetermined parity, so as to switch the system from the first level (401) to the second level (402), the exciter (204) being configured to generate the first and second frequency combs so that, for each integer k:
the first comb (405) comprises a first line if the integer k does not have the predetermined parity, the first line having a frequency equal to a transition frequency between the first and third levels, and
the second comb (406) comprises a second line having a frequency equal to a transition frequency between the third and fourth levels.

4. The system according to claim 3, wherein the harmonic oscillator (202) comprises the second number of bosons equal to the integer k+1 in the fourth level (402).

5. The system according to claim 3, wherein the information is encoded in states of the oscillator corresponding to a number of bosons comprised between a floor integer $k_{min}$ having the predetermined parity and a ceiling integer $k_{max}$ having the predetermined parity, the set of integers being equal to the integers included between the integers $k_{min}-1$ and $k_{max}-1$.

6. The system according to claim 1, wherein the quantum harmonic oscillator (202) is a first superconducting microwave resonator, the auxiliary system (201) is a transmon, the dissipator (203) is a second superconducting microwave resonator having a quality factor lower than a quality factor of the first superconducting microwave resonator.

7. The system according to claim 1, wherein an amplitude of the lines of the first frequency comb and of the second frequency comb is characterized by a coupling frequency, the coupling frequency being lower than the quarter of the second frequency difference.

8. A method for autonomous stabilization of quantum states comprising the following steps:
encoding information in states of a quantum harmonic oscillator, the states having a predetermined parity of a number of bosons comprised in the harmonic oscillator,
dispersively coupling the harmonic oscillator to an auxiliary device, so that a frequency difference between a ground state |g> of the auxiliary device and an excited state |f> of the auxiliary device depends linearly on a frequency shift $\chi$ and the number of bosons,
coupling the auxiliary device to a dissipator configured to switch from an excited state |1> to a ground state |0>,
generating first and second frequency combs, a first frequency difference separating two successive lines of the first frequency comb being equal to twice the frequency shift $\chi$ and equal to twice a second frequency difference separating two successive lines of the second comb, and
sending the first and second frequency combs to at least one amongst the quantum harmonic oscillator, the auxiliary device and the dissipator so as to add a boson in the harmonic oscillator if the number of bosons does not have the predetermined parity.

9. The method according to claim 8, further comprising an optimization of the amplitude of the lines of the first and second frequency combs, the amplitude of the lines being characterized by a coupling frequency, comprising the following steps:
selecting a coupling frequency value lower than the quarter of the second frequency difference,
measuring a lifetime of the states having a number of bosons of the predetermined parity, and
modifying the value of the coupling frequency based on the lifetime measured according to an optimization algorithm of the lifetime so as to identify an optimal value of the coupling frequency corresponding to a maximum of the lifetime.

10. The method according to claim 8, further comprising an optimization of a de-energization rate $\gamma_{dis}$ equal to the probability of switching from the level |1> into the level |0> per unit of time, comprising the following steps:
selecting a value of the de-energization rate lower than the second frequency difference,
measuring a lifetime of the states having a number of bosons of the predetermined parity, and modifying the value of the de-energization rate based on the lifetime measured according to an optimization algorithm of the lifetime so as to identify an optimal value of the de-energization rate corresponding to a maximum of the lifetime.

\* \* \* \* \*